United States Patent
Haraldsson et al.

(10) Patent No.: US 10,570,774 B2
(45) Date of Patent: Feb. 25, 2020

(54) TURBOCOMPOUND UNIT

(71) Applicant: VOLVO TRUCK CORPORATION, Göteborg (SE)

(72) Inventors: Göran Haraldsson, Hörby (SE); Kent Giselmo, Vellinge (SE)

(73) Assignee: VOLVO TRUCK CORPORATION, Göteborg (SE)

( * ) Notice: Subject to any disclaimer, the term of this patent is extended or adjusted under 35 U.S.C. 154(b) by 457 days.

(21) Appl. No.: 15/026,216

(22) PCT Filed: Oct. 24, 2013

(86) PCT No.: PCT/EP2013/003207
§ 371 (c)(1),
(2) Date: Mar. 30, 2016

(87) PCT Pub. No.: WO2015/058779
PCT Pub. Date: Apr. 30, 2015

(65) Prior Publication Data
US 2016/0222826 A1 Aug. 4, 2016

(51) Int. Cl.
*F01D 25/16* (2006.01)
*F02B 41/10* (2006.01)
(Continued)

(52) U.S. Cl.
CPC ............. *F01D 25/162* (2013.01); *F01D 5/02* (2013.01); *F01D 25/18* (2013.01); *F01D 25/24* (2013.01);
(Continued)

(58) Field of Classification Search
CPC ........ F01D 25/162; F01D 25/18; F01D 25/24; F01D 5/02; F02B 41/10; F05D 2220/62;
(Continued)

(56) References Cited

U.S. PATENT DOCUMENTS

| 3,937,535 | A | * | 2/1976 | Ladin | .................. B60B 27/0005 |
| | | | | | 384/540 |
| 4,768,634 | A | * | 9/1988 | Quick | ..................... F16D 41/22 |
| | | | | | 192/150 |

(Continued)

FOREIGN PATENT DOCUMENTS

| DE | 3923370 A1 | 1/1991 |
| DE | 102011007250 A1 | 10/2012 |

(Continued)

OTHER PUBLICATIONS

JPH01159420 Translation; Makoto, Protector for Turbo Compound Engine.*

(Continued)

*Primary Examiner* — Jesse S Bogue
(74) *Attorney, Agent, or Firm* — Venable LLP; Jeffri A. Kaminski

(57) ABSTRACT

A turbocompound unit is provided. The turbocompound unit includes a turbine shaft, a turbine wheel supported at one end of the turbine shaft and a gear wheel supported at an opposite end of the turbine shaft. Further, the turbocompound unit includes a rolling bearing cartridge including at least two axially spaced-apart raceways, each housing a plurality of rolling elements, wherein the rolling bearing cartridge is arranged concentrically on the turbine shaft between the turbine wheel and the gear wheel for allowing the turbine shaft to rotate.

15 Claims, 3 Drawing Sheets

(51) Int. Cl.
*F01D 5/02* (2006.01)
*F01D 25/18* (2006.01)
*F01D 25/24* (2006.01)
*F16C 19/18* (2006.01)
*F16C 33/78* (2006.01)
*F16C 35/12* (2006.01)

(52) U.S. Cl.
CPC .............. *F02B 41/10* (2013.01); *F16C 19/18* (2013.01); *F16C 33/78* (2013.01); *F16C 35/12* (2013.01); *F05D 2220/62* (2013.01); *F05D 2230/60* (2013.01); *F05D 2240/54* (2013.01); *F05D 2240/60* (2013.01)

(58) Field of Classification Search
CPC ............ F05D 2230/60; F05D 2240/54; F05D 2240/60; F16C 19/18; F16C 19/184; F16C 2360/00; F16C 27/045; F16C 33/78
See application file for complete search history.

(56) References Cited

U.S. PATENT DOCUMENTS

| | | | | |
|---|---|---|---|---|
| 4,871,296 | A * | 10/1989 | Laessle | F02C 7/277 415/123 |
| 4,926,631 | A * | 5/1990 | Sorenson | F02C 7/277 192/45.1 |
| 5,145,334 | A * | 9/1992 | Gutknecht | F01D 25/164 417/407 |
| 6,318,958 | B1 * | 11/2001 | Giesler | F01D 11/00 415/111 |
| 6,585,483 | B2 * | 7/2003 | Feest | F02C 7/277 415/122.1 |
| 6,769,809 | B2 * | 8/2004 | Maret | F16C 19/184 384/512 |
| 8,602,655 | B2 * | 12/2013 | Tabata | F01D 5/027 384/490 |
| 9,115,761 | B2 * | 8/2015 | Mavrosakis | F16C 33/585 |
| 9,874,217 | B2 * | 1/2018 | Ramasamy | F01D 25/186 |
| 2005/0286819 | A1 | 12/2005 | Mavrosakis | |
| 2012/0051906 | A1 * | 3/2012 | House | F01D 25/16 415/229 |
| 2013/0135301 | A1 | 8/2013 | Cornelio | |

FOREIGN PATENT DOCUMENTS

| | | |
|---|---|---|
| EP | 1197638 A2 | 4/2002 |
| EP | 2420660 A1 | 2/2012 |
| JP | S60043137 | 3/1985 |
| JP | S6321332 A | 1/1988 |
| JP | H01159420 A | 6/1989 |
| JP | H05106457 | 4/1993 |
| JP | H05106457 A | 4/1993 |
| JP | H0618631 A | 3/1994 |
| JP | H06018631 | 3/1994 |
| JP | 2000205039 A | 7/2000 |
| JP | 2001132461 A | 5/2001 |
| JP | 2006029221 A | 2/2006 |
| JP | 2008504484 | 2/2008 |
| JP | 2010138753 | 6/2010 |
| JP | 2010138753 A | 6/2010 |
| JP | 2011220273 A | 11/2011 |
| JP | H0458451 A | 11/2011 |
| RU | 2291306 C2 | 5/2005 |
| WO | 02086292 A1 | 10/2002 |
| WO | 2008011400 A2 | 1/2008 |
| WO | 2010109653 A1 | 9/2010 |
| WO | 2010129407 A1 | 11/2010 |

OTHER PUBLICATIONS

Internatonal Search Report (dated Jun. 20, 2014) for corresponding International App. PCT/EP2013/003207.
International Preliminary Report on Patentability (dated Feb. 10, 2016) for corresponding International App. PCT/EP2013/003207.
Japanese Official Action (dated Aug. 9, 2017) for corresponding Japanese App. 2016-525912.
Japanese Official Action (dated Dec. 28, 2017) for corresponding Japanese App. 2016-525912.
JP H06280772 (Abstract) (Oct. 4, 1994) Honda Motor Co. Ltd.
Chinese Official Action (dated Jun. 14, 2018) for corresponding Chinese App. 201380080356.4.
Russian Official Action (dated Jan. 15, 2018) for corresponding Russian App. 2016 119 785.

* cited by examiner

TURBOCOMPOUND UNIT

BACKGROUND AND SUMMARY

The present invention relates to a turbocompound unit, as well as to a method for manufacturing a turbocompound unit.

A turbocompound unit is a vehicle component used for recovering a pan of the energy of the exhaust gas flow and to convert that energy into a rotational movement of a shaft. The rotational movement of the shaft is transferred as a torque increase to the crankshaft of the vehicle.

Normally, the turbocompound unit has a shaft, wherein a turbine wheel is arranged at one distal end. When the internal combustion engine is running, exhaust gas will flow into the turbocompound unit and cause the turbine wheel to rotate. Hence, the shaft of the turbocompound unit will rotate accordingly.

The opposite end of the shaft is provided with a gear wheel which meshes with additional gears for causing a rotational coupling between the shaft and the crankshaft of the vehicle. When the shaft is rotating due to exhaust gas flowing through the turbocompound unit, the rotational energy of the shaft will be transferred to the crankshaft as a torque increase.

The use of turbocompound units in a vehicle has proven to provide significant advantages on driving economics as well as on the environment; the energy recovery from the exhaust gas flow will in fact reduce the fuel consumption of the vehicle.

The shaft of the turbocompound unit is allowed to rotate relative a housing, whereby it is required to support the shaft for allowing such rotation. For this, bearings are normally used.

One example of a turbocompound unit is described in WO8600665. Here, the shaft is supported by two spaced apart roller bearings arranged between the turbine wheel and the gear wheel. However, a solution of this type provides a number of drawbacks. For example, each roller bearing needs to be accurately aligned such that there are no vibrations in the shaft. Should there be only a slight difference between the alignment of the two roller bearings the efficiency of the turbocompound unit will decrease rapidly. In order to ensure proper operation of the turbocompound unit, a critical and complex assembly method is needed. Further, the bearings need to have an axial pretension. The different materials of the bearing, raceways, and the surrounding housing will cause different expansion upon temperature variations, which thus requires the pretension to be sufficiently large. Since an increased pretension is required, the bearings will consequently suffer from an increased friction.

There is thus a need for an improved turbocompound unit.

It is desirable to provide a turbocompound unit allowing for a more simple and cost-effective manufacturing.

According to a first aspect, a turbocompound unit comprises a turbine shaft, a turbine wheel supported at one end of the turbine shaft and a gear wheel supported at an opposite end of the turbine shaft. Further, the turbocompound unit comprises a rolling bearing cartridge comprising at least two axially spaced-apart raceways, each housing a plurality of rolling elements, wherein the rolling hearing cartridge is arranged concentrically on the turbine shaft between the turbine wheel and the gear wheel for allowing said turbine shaft to rotate.

The rolling elements may be balls or rollers, whereby the cartridge may be manufactured for standard rolling elements.

The turbocompound unit may further comprise a housing, wherein the rolling bearing cartridge comprises an inner race being arranged against the turbine shaft and an outer race being arranged against the housing, wherein the inner race and the outer race forms at least two axially spaced-apart raceways for rolling elements. By arranging the outer race against the housing it is possible to provide oil squeeze films between the housing and the outer race, thus eliminating the need for separate sleeves.

One lateral end of said inner race may be in contact with said gear wheel, which is advantageous in that such contact will increase the torque transfer to the gear wheel, since the axial connection between the cartridge and the gear wheel will reduce vibrations.

One lateral end of the inner race may extend into an oil slinger.

Optionally, the oil slinger may be formed integrally with the inner race. Hence, the shaft assembly is simplified since a separate step of mounting the oil slinger ring is omitted.

The oil slinger may be arranged at the lateral end of the inner race facing the turbine wheel. The oil slinger comprises a part projecting radially outwards from the lateral end of the inner race. By having an oil slinger in connection with the cartridge, the diameter of the oil slinger may be made larger and hence more effective.

The outer race may comprise at least one oil inlet arranged axially between said raceways. The outer race may further comprise at least on oil outlet arranged axially between said raceways. Hence, efficient lubrication of the bearing may be provided in a simple and reliable manner.

The oil inlet and the oil outlet may be spaced apart along the periphery of said outer race. This is advantageous in that the oil may be injected from an upper side of the cartridge, while oil may exit the cartridge at a lower side due to gravity.

According to a second aspect, an internal combustion engine is provided. The internal combustion engine comprises a turbocompound unit as described above, wherein the gear wheel is arranged to transfer torque from the turbine shaft to a crankshaft.

According to a further aspect a method for manufacturing a turbocompound unit is provided. The method comprises the steps of rotationally rigidly arranging a concentric turbine wheel on a turbine shaft at one end of the turbine shaft, inserting the turbine wheel and the turbine shaft in a housing, arranging a rolling bearing cartridge comprising at least two axially spaced-apart raceways, each housing a plurality of rolling elements, concentrically around the turbine shaft for allowing said turbine shaft to rotate relative said housing, and arranging a concentric gear wheel at an opposite end of the turbine shaft in relation to the turbine wheel.

The step of arranging a concentric gear wheel at an opposite end of the turbine shaft in relation to the turbine wheel may comprise arranging said gear wheel in close contact with said rolling bearing cartridge.

BRIEF DESCRIPTION OF DRAWINGS

Hereinafter, the invention will be described with reference to the appended drawings, wherein.

DETAILED DESCRIPTION

Figures 1, 2:
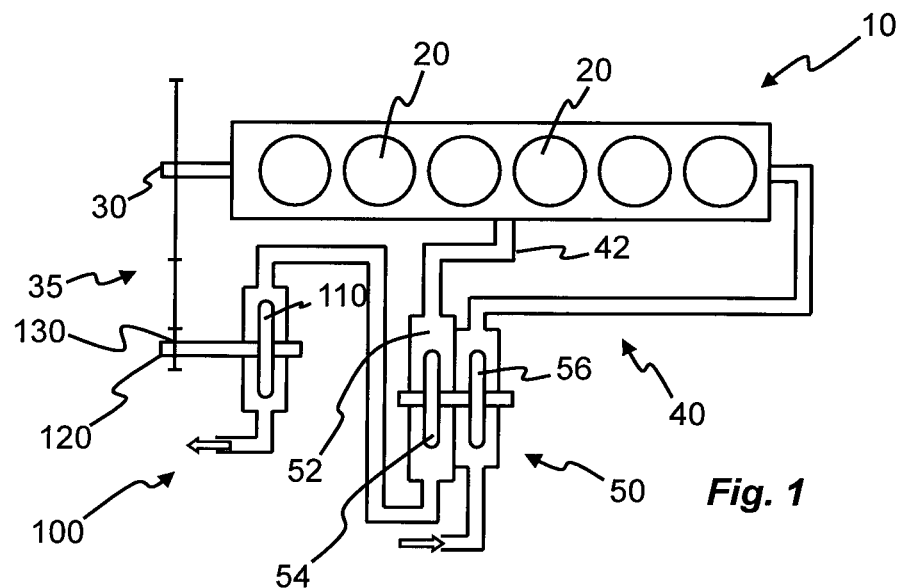
FIG. 1 is a schematic view of an internal combustion engine according to an embodiment.
FIG. 2 is a side view of a turbocompound unit according to an embodiment.

Starting with FIG. 1, an internal combustion engine 10 is shown. The internal combustion engine 10 includes a plurality of cylinders 20 operated to combust fuel, such as diesel or gasoline, whereby the motion of pistons reciprocating in the cylinders 20 is transmitted to a rotation movement of a crank shaft 30. The crank shaft 30 is further coupled to a transmission (not shown) for providing a torque to driving elements (not shown). In case of a heavy vehicle, such as a truck, the driving, elements are wheels; however the internal combustion engine 10 may also be used for other equipment such as construction equipment, marine applications, etc.

The internal combustion engine 10 further comprises an exhaust gas system 40, which system 40 serves the purpose of recovering at least some of the energy in the exhaust gas flow to improve the performance of the internal combustion engine 10. In the shown example the exhaust gas exits the cylinders 20 and enters a manifold 42 which is further connected to an inlet 52 of a turbo charger 50. The exhaust gas flow causes a turbine wheel 54 to rotate, which rotation is translated to a corresponding rotation of a compressor wheel 56 being used to compress incoming air before it the air introduced in the cylinders 20. The structural as well as functional specifications of a turbocharger 50 are well known in the art and will not be described in further details.

The exhaust gas exits the turbocharger 50 and flows to a turbocompound unit 100, optionally via an exhaust gas regulator (not shown). The incoming exhaust gas, from which some energy have already been used to drive the turbine wheel 54 of the turbo charger 50, is guided to pass a turbine wheel 110 of the turbocompound unit 100, thus causing the turbine wheel 110 and an associated turbine shaft 120 to rotate. A gear wheel 130 is fixedly arranged on the turbine shaft 120 and meshes with further gearings 35 in order to couple the turbine shaft 120 to the crankshaft 30. Hence, when the turbine wheel 110 is forced to rotate the turbine shaft 120 will provide an additional torque to the crankshaft 30.

The exhaust, gas exiting the turbocompound flows into an aftertreatment system which provides filtering and removal of toxic substances, such as $NO_x$, from the exhaust gas before it leaves the internal combustion engine 10 via a tailpipe.

Now turning to FIG. 2, a more detailed description of the turbocompound unit 100 will be given. Incoming exhaust gas passes the turbine wheel 110 which is supported by the turbine shaft 120. The turbine wheel 110 is arranged at one end of the turbine shaft 120 in a concentric manner, such that the turbine wheel 110 and the turbine shaft 120 shares a common rotational axis. The turbine shaft 120 is allowed to rotate relative a fixed housing 180. For this, the turbine shaft 120 extends through a cavity of the housing 140, which cavity is formed as a through hole being configured to receive the turbine shaft 120.

The opposite end of the turbine shaft 120 is provided with a gear wheel 130, which is arranged outside the housing 140 and being rotationally secured to the turbine shaft 120 by means of a clamping ring 150. The clamping ring 150 is axially secured by a cylindrical portion 122 on the turbine shaft 120, such that the clamping ring 150 is pressed between the cylindrical portion 122 and the gear wheel 130. The cylindrical portion 122 thus forms an end part of the turbine shaft 120 having a slightly larger diameter than the inner diameter of the clamping ring 150.

A roller bearing cartridge 160 is provided between the turbine shaft 120 and the housing 140 for allowing the turbine shaft 120 to rotate relative the housing 140. The roller bearing cartridge 160 has an inner race 162 and an outer race 164 between which rolling elements 166 are arranged. The inner race 162 and the outer race 164 forms at least two spaced apart raceways, such that two individual sets of rolling elements 166a 166b are allowed to rotate within each raceway. The raceways, formed by the respective path of each set of rolling elements 166a, 166b, extend in parallel such that each raceway forms a closed loop along the periphery of the inner race 162. Hence, the raceways are arranged in a direction being perpendicular to the rotational axis of the turbine shaft 120.

The housing 140 further comprises an oil supply 142, which is provided as a cavity within the housing 140. The cavity 142 is in fluid communication with the interior of the roller bearing cartridge 160 by means of oil inlets 168 provided in the outer race 164. Hence, the oil supply 142 allows lubrication fluid, such as oil, to flow to the oil inlets 168 whereby the lubrication fluid may flow into the roller bearing cartridge 140 be means of gravity.

In order to support the turbine wheel 110 and the gear wheel 130 the turbine shaft 120 is preferably formed as a cylindrical body, wherein the outer diameter of the turbine shaft 120 varies along its longitudinal axis. Starting at the turbine wheel end, the turbine shaft 120 has a distal portion 124 with a first diameter D1. The distal portion 124 of the turbine shaft 120 serves two purposes, namely i) to connect the turbine wheel 110, and ii) to provide a sealing against the housing 140. Adjacent to the distal portion 124 a bearing portion 126 is provided having a second diameter D2. The bearing portion 126 serves to support the inner race 162 of the roller bearing cartridge 160. The bearing portion 126 is arranged between the distal portion 124 and a gear portion 128 having a diameter D3. The gear portion 128 serves to support the gear wheel 130 and the clamping ring 150. In a preferred embodiment, D1>D2>D3.

As can further be seen in FIG. 2, the housing 140 seals off the turbine shaft 110 and the e associated gear wheel 130 from the area of the turbine wheel 110 in which the exhaust gas is flowing. For this, the distal portion 124 of the turbine shaft 120 comprises one or more recesses, each of which forms an annular groove. Such groove, which is left open towards the housing, may be pressurized such that an overpressure is provided in these grooves. Hence, should the exhaust gas flow cause an under pressure on the turbine wheel, side of the turbocompound unit 100 the overpressure provided in the annular grooves will prevent oil or other particles to be drawn into the exhaust gas flow.

Now turning to FIGS. 3a and 3b different embodiments of a turbocompound unit 100 will be described. The embodiments shown share the same structural features as already have been described with reference to FIG. 2, such as the turbine wheel 110, the turbine shaft 120, and the gear wheel 130.

The roller bearing cartridge 160 comprises the inner race 162, clamped onto the bearing portion 126 of the turbine shaft 120, and the outer race 164 which is fixed to the housing. Two sets of rolling elements 166a, 166b are arranged to rotate in two spaced apart raceways being provided between the inner race 162 and the outer race 164.

The roller bearing cartridge 160 provides an enhanced fixation of the turbine shaft 120 relative the housing 140 such that the shaft 120 is prevented from tilting relative its longitudinal axis. By securing the position of the turbine shaft 120, it has been discovered that the radial tip clearance of the turbine wheel 110 may be made smaller, which results in an increased efficiency of the turbocompound unit 100.

Two oil inlets 168 are provided as through holes in the outer race 164. The oil inlets 168 are arranged axially between the axial positions of the militia elements 166a, 166b. Further, each oil inlet 168 is preferably angled such that oil entering the roller bearing cartridge 160 from the oil supply 142 of the housing 140 (see FIG. 2) is directed towards the rolling elements 166a, 166b.

Further, the outer race 164 comprises an oil outlet 169 which is arranged 180° from the oil inlets 168. The oil outlet 169 allows excess lubrication fluid to exit the roller bearing cartridge 160. The axial position of the oil outlet 169 is preferably between the positions of the oil inlets 168. Since the outer race 164 is always fixed relative the housing 140, the oil inlets 168 will always be aligned with the oil supply 142 of the housing 140. Further, the oil outlet 169 may be aligned with an oil sump or reservoir (not shown).

Figure 3A:
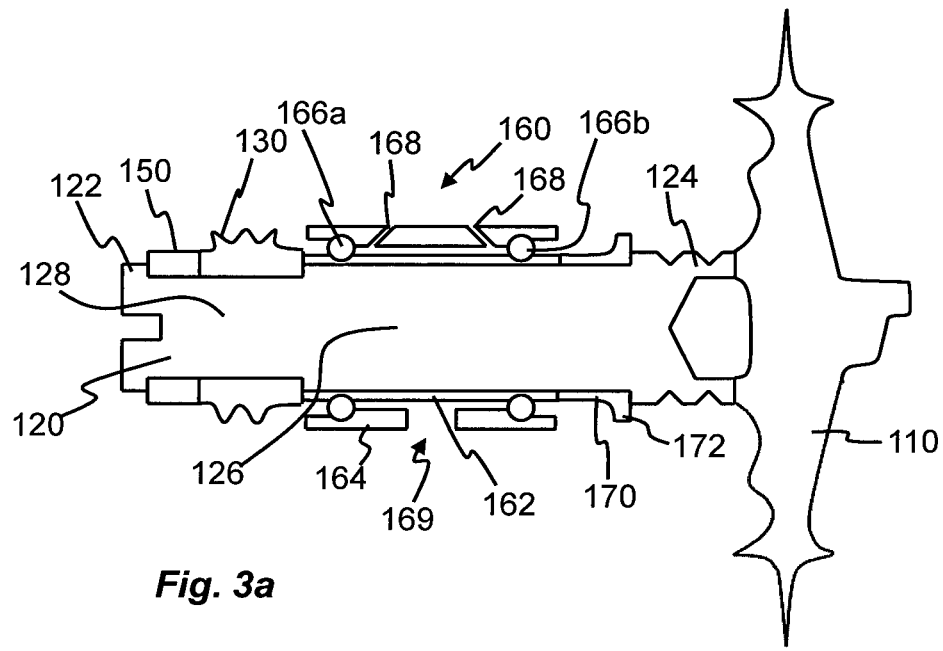
FIG. 3a is a side view of a turbine shaft of a turbocompound unit according to an embodiment.
Figure 3B:
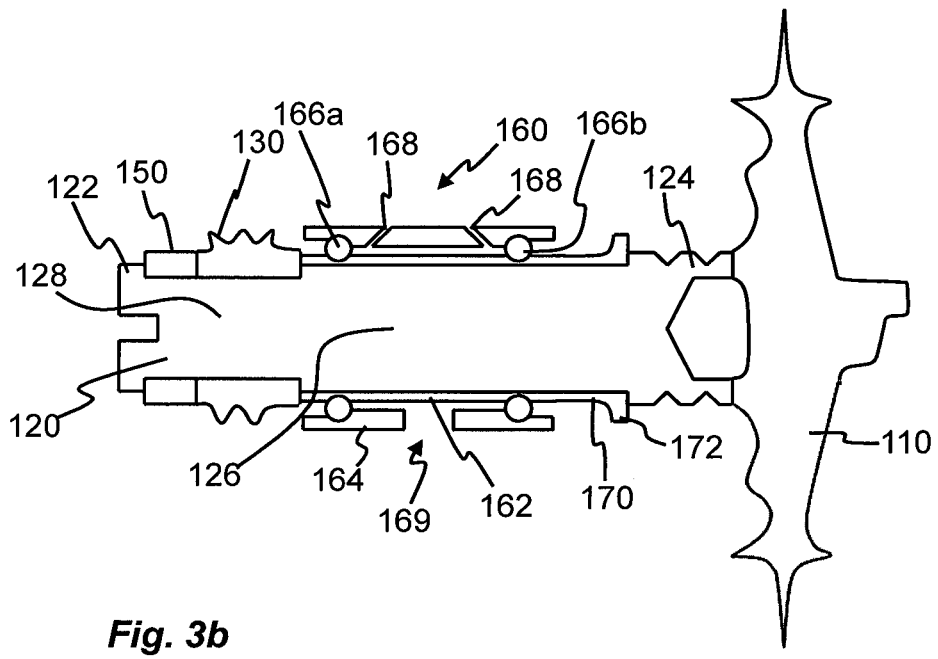
FIG. 3b is a side view of a turbine shaft of a turbocompound unit according to a further embodiment.

As can be seen in FIGS. 3a and 3b, there is a closed contact connection between the inner race 162 and the gear wheel 130. In a preferred embodiment, the gear wheel 130 is clamped against the lateral end of the inner race 162 such that the gear wheel 130 will be exposed to forces acting on the inner race 162. Since the inner race 162 is securely clamped to the turbine shaft 120 by radial compression, the inner race 162 will actually provide a torque transfer to the gear wheel 130 during operation. The mechanical connection between the inner race 162 and the gear wheel 130 has also proven to reduce vibrations of the turbocompound unit 100, thereby reducing energy losses and wear during operation. Further, since the provision of the gear wheel 130 provides a controlled, pretension of the roller bearing cartridge 160, the torque transfer provided to the crankshaft will be controlled accordingly.

The opposite end of the inner race 162, i.e. the end facing the turbine wheel 100, comprises an oil slinger 170. The oil slinger 170 forms a cylindrical body which extends into a radial protrusion 172, i.e. a part projecting radially outwards from the lateral end of the inner race 162. The radial protrusion 172 will force any lubrication oil escaping out from the roller bearing cartridge 160 to be directed in the direction of the radial protrusion 172. The radial protrusion 172 is preferably arranged adjacent to the distal portion 124 of the turbine shaft 120, i.e. adjacent to where the turbine shaft 120 and the housing 140 seals of the area of the turbine wheel 110. Preferably, the outer diameter of the radial protrusion 172 is larger than the outer diameter of the distal portion 124 of the turbine shaft 120. Hence, oil or other lubrication fluid will be prevented to enter the sealing area. An additional advantage is that b increasing the diameter of the oil slinger 170, i.e. the diameter of the radial protrusion 172, the speed of the radial protrusion 172 will increase thus leading to an improved oil sling effect.

As can be seen in FIG. 3a the oil slinger 170 is formed as a separate piece which is arranged in close contact with the inner race 162 of the roller bearing cartridge 160.

Another embodiment is shown in FIG. 3b, where the oil slinger 170 is formed integrally with the inner race 162.

The outer race 164 is preferably coupled to the housing 140 via oil squeeze films which are provided at the axial ends of the outer race 164 in order to reduce vibrations during operation.

Figure 4:
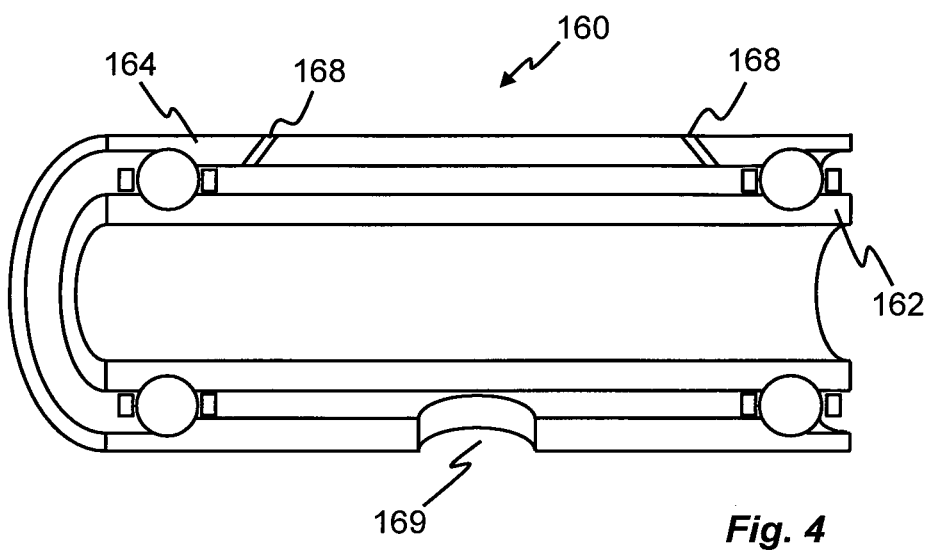
FIG. 4 is a cross sectional view of a roller bearing cartridge of a turbocompound unit according to an embodiment.

The roller bearing cartridge 160 is shown also in FIG. 4. As is clear from this illustration, the inner race 162 forms a cylindrical sleeve which is clamped onto the turbine shaft. Correspondingly, the outer race 164 also forms a cylindrical sleeve which is secured to the housing as has been previously described. The outer race 164 includes two holes forming the oil inlets 168. The oil inlets 168 are aligned along an axis being parallel with the longitudinal axis of the entire roller bearing cartridge. When moving along the periphery of the outer race 164, the oil outlet 169 is formed by a hole in the outer race 164 arranged approximately 180° from the oil inlets 168. As can be seen in FIG. 4, the diameter of the oil outlet 169 is larger than the diameter of the oil inlets 168. The roller bearing cartridge 160 shows no oil slinger. However, the roller bearing cartridge 160 shown in FIG. 4 may be provided with an oil slinger in accordance with the description of FIGS. 3a and 3b. Although FIG. 4 shows the inner race 162 and the outer race 164 as cylindrical bodies having a constant diameter, it should be realized that the diameters of the inner race 162 and the outer race 164 may vary along their respective longitudinal axis.

Figure 5:
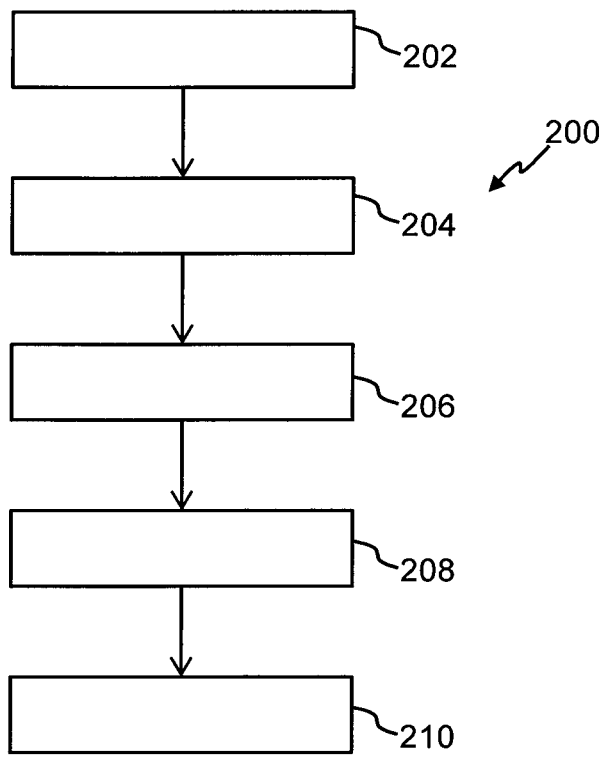
FIG. 5 is a schematic view of a method according to an embodiment.

Now turning to FIG. 5, a method 200 for manufacturing a turbocompound unit 100 will be described. Starting at step 202 a turbine shaft 120 is provided. One end of the turbine shaft 120 is preferably connected to a turbine wheel 110.

In step 204, the turbine shaft 120 is inserted into a housing such that the turbine shaft 120 extends into the housing 140 while the turbine wheel 110 is arranged outside the housing in an exhaust gas flow path.

In step 206 a roller bearing cartridge 160 is provided to surround the turbine shaft 120 and to allow the turbine shaft 120 to rotate relative the housing 140. Preferably, step 206 also comprises providing an oil slinger 170, The roller bearing cartridge 160 may be provided such that oil inlets 168 of the outer race 164 are aligned with a pre-existing cavity of the housing 140, which cavity serves as an oil supply 142.

In step 208 the turbine shaft 120 is provided with a gear wheel 130. In a preferred embodiment the gear wheel 130 is clamped against an inner race 162 of the roller bearing cartridge 160 such that the gear wheel 130 is mechanically coupled to the inner race 162.

In a last step 210 the gear wheel 130 is axially secured by means of a clamp ring 150.

The roller bearing cartridge 160 has been described as having two separate sets of rolling elements 166a, 166b running in two spaced apart raceways. It should however be realized that an increased number of rolling element sets may be utilized, such as four, six, etc. For such embodiments, the oil inlets 168 and oil outlets 169 may be distributed such that lubrication fluid is supplied to all sets of rolling elements.

It will be appreciated that the embodiments described in the foregoing may be combined without departing from the scope as defined by the appended claims.

In the claims, the term "comprises/comprising" does not exclude the presence of other elements or steps. Additionally, although individual features may be included in different claims, these may possibly advantageously be combined, and the inclusion in different claims does not imply that a combination of features is not feasible and/or advantageous. In addition, singular references do not exclude a plurality. The terms "a", "an", etc do not preclude a plurality.

The invention claimed is:

1. A turbocompound unit, comprising:
   a turbine shaft, a turbine wheel supported at one end of the turbine shaft and a gear wheel supported at an opposite end of the turbine shaft; and
   a single rolling bearing cartridge comprising at least two axially spaced-apart raceways, each raceway of the at least two axially spaced-apart raceways housing a plurality of rolling elements, the single rolling bearing cartridge being arranged concentrically on the turbine shaft between the turbine wheel and the gear wheel for allowing the turbine shaft to rotate,
   wherein the turbocompound unit further comprises a housing; and
   wherein the single rolling bearing cartridge comprises an inner race arranged against and in contact with the turbine shaft over an entire length of the inner race and an outer race arranged against the housing, wherein the gear wheel clamped against the lateral end of the inner race such that one lateral end of the inner race is in contact with the gear wheel and such that the gear wheel will be exposed to forces acting on the inner race, and whereby the inner race is securely clamped to the turbine shaft by radial compression.

2. The turbocompound unit according to claim 1, wherein the rolling elements are balls or rollers.

3. The turbocompound unit according to claim 1, wherein one lateral end of the inner race extends into an oil slinger.

4. The turbocompound unit according to claim 3, wherein the oil slinger is formed integrally with the inner race.

5. The turbocompound unit according to claim 3, wherein the oil slinger is arranged at the lateral end of the inner race facing the turbine wheel.

6. The turbocompound unit according to claim 3, wherein the oil slinger comprises a part projecting radially outwards from the lateral end of the inner race.

7. The turbocompound unit according to claim 3, wherein the outer race comprises at least one oil inlet arranged axially between the raceways.

8. The turbocompound unit according to claim 1, wherein the outer race further comprises at least one oil outlet arranged axially between the raceways.

9. The turbocompound unit according to claim 7, wherein the outer race further comprises at least one oil outlet arranged axially between the raceways, and the oil inlet and the oil outlet are spaced apart along the periphery of the outer race.

10. An internal combustion engine comprising a turbocompound unit according to claim 1, wherein the gear wheel is arranged to transfer torque from the turbine shaft to a crankshaft.

11. A method for manufacturing a turbocompound unit, comprising:
    rotationally rigidly arranging a concentric turbine wheel on a turbine shaft at one end of the turbine shaft;
    inserting the turbine wheel and the turbine shaft in a housing;
    arranging a single rolling bearing cartridge comprising at least two axially spaced-apart raceways, each raceway of the at least two axially spaced-apart raceways housing a plurality of rolling elements, concentrically around the turbine shaft for allowing the turbine shaft to rotate relative the housing, an inner race of the single rolling bearing cartridge contacting the turbine shaft over an entire length of the inner race; and
    arranging a concentric gear wheel at an opposite end of the turbine shaft in relation to the turbine wheel including clamping the gear wheel against the lateral end of the inner race, such that the gear wheel will be exposed to forces acting on the inner race, whereby the inner race is securely clamped to the turbine shaft by radial compression and whereby the gear wheel is arranged in close contact with the single rolling bearing cartridge.

12. The method according to claim 11, wherein the gear wheel is clamped against the lateral end of the inner race such that the gear wheel will be exposed to forces acting on the lateral end of the inner race.

13. The method according to claim 11, wherein the inner race is arranged on a bearing portion of the turbine shaft, the bearing portion having a single diameter along its length.

14. The turbocompound unit according to claim 1, wherein the gear wheel is clamped against the lateral end of the inner race such that the gear wheel will be exposed to forces acting on the lateral end of the inner race.

15. The turbocompound unit according to claim 1, wherein the inner race is arranged on a bearing portion of the turbine shaft, the bearing portion having a single diameter along its length.

* * * * *